(12) United States Patent
He et al.

(10) Patent No.: US 12,363,736 B2
(45) Date of Patent: Jul. 15, 2025

(54) PHYSICAL DOWNLINK CONTROL CHANNEL TRANSMISSION IN WIRELESS COMMUNICATION

(71) Applicant: Apple Inc., Cupertino, CA (US)

(72) Inventors: Hong He, San Jose, CA (US); Dawei Zhang, Saratoga, CA (US); Haitong Sun, Cupertino, CA (US); Jie Cui, San Jose, CA (US); Manasa Raghavan, Sunnyvale, CA (US); Wei Zeng, Saratoga, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/442,814

(22) PCT Filed: Jul. 29, 2021

(86) PCT No.: PCT/US2021/043726
§ 371 (c)(1),
(2) Date: Sep. 24, 2021

(87) PCT Pub. No.: WO2022/031515
PCT Pub. Date: Feb. 10, 2022

(65) Prior Publication Data
US 2023/0362952 A1  Nov. 9, 2023

Related U.S. Application Data

(60) Provisional application No. 63/061,577, filed on Aug. 5, 2020, provisional application No. 63/061,546, filed on Aug. 5, 2020.

(51) Int. Cl.
*H04W 72/232* (2023.01)
*H04W 72/1263* (2023.01)

(52) U.S. Cl.
CPC ..... *H04W 72/232* (2023.01); *H04W 72/1263* (2013.01)

(58) Field of Classification Search
CPC ........... H04W 72/232; H04W 72/1263; H04W 4/025; H04W 4/42; H04L 5/001; H04L 5/0053; H04L 5/0023; H04B 7/0695
(Continued)

(56) References Cited

U.S. PATENT DOCUMENTS

2019/0260458 A1\* 8/2019 Zhou ................... H04W 72/046
2019/0327768 A1\* 10/2019 Kim .................... H04W 74/006
(Continued)

FOREIGN PATENT DOCUMENTS

| CN | 108702180 A | 11/2018 |
| CN | 108810966 A | 11/2018 |

(Continued)

OTHER PUBLICATIONS

3rd Generation Partnership Project; Technical Specification Group Radio Access Network; NR; "Multiplexing and channel coding" (Release 15); 3GPP TS 38.212 V15.9.0; Jun. 2020.
(Continued)

*Primary Examiner* — Hashim S Bhatti
*Assistant Examiner* — Oladiran Gideon Olaleye
(74) *Attorney, Agent, or Firm* — Eschweiler & Potashnik, LLC; Matthew W Glause

(57) ABSTRACT

A user equipment (UE), or other network device (e.g., next generation NodeB (gNB)) component can operate to process or configure a search space information element (IE) that is configured with at least one of: a transmission configuration indicator (TCI) state identifier (ID) of a TCI, or a physical downlink control channel (PDCCH) repetition field indicating a number of PDCCH repetitions, or a number of UE-specific search space (USS) repetitions for the PDCCH. A
(Continued)

UE can perform search space set group (SSSG) beam switching based on one or more TCI states and at least one of: a search space set (SSS) index, an SSSG index, or a beam switching request (BSR) field value. A physical downlink control channel (PDCCH) associated with the search space can be transmitted for beam switching according to a search space information element.

16 Claims, 9 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2020/0008235 A1* | 1/2020 | Sarkis ................... | H04L 5/0055 |
| 2020/0021350 A1 | 1/2020 | Koskela | |
| 2020/0053757 A1* | 2/2020 | Bagheri ............ | H04W 72/0446 |
| 2020/0068574 A1 | 2/2020 | Qin | |
| 2020/0120584 A1* | 4/2020 | Yi .......................... | H04L 5/0048 |
| 2020/0146058 A1* | 5/2020 | Xu ..................... | H04W 72/0453 |
| 2020/0146062 A1* | 5/2020 | Xu ........................ | H04W 72/23 |
| 2021/0259003 A1 | 8/2021 | Hang et al. | |
| 2021/0306867 A1 | 9/2021 | Hamidi-Sepehr et al. | |
| 2022/0216929 A1* | 7/2022 | Matsumura ......... | H04W 52/146 |
| 2023/0112271 A1* | 4/2023 | Kim ..................... | H04L 5/0053 370/329 |

FOREIGN PATENT DOCUMENTS

| | | | | |
|---|---|---|---|---|
| CN | 109937540 A | 6/2019 | | |
| EP | 3809650 A1 | 4/2021 | | |
| WO | 2017151876 A1 | 9/2017 | | |
| WO | 2018060928 A1 | 4/2018 | | |
| WO | WO-2018202137 A1 * | 11/2018 | ........... | H04L 5/0051 |
| WO | WO-2019138081 A1 * | 7/2019 | ........... | H04B 7/0695 |
| WO | WO-2019244222 A1 * | 12/2019 | ....... | H04L 27/26025 |
| WO | 2020/033549 A1 | 2/2020 | | |
| WO | 2020/033884 A1 | 2/2020 | | |
| WO | 2020/088551 A1 | 5/2020 | | |

OTHER PUBLICATIONS

3rd Generation Partnership Project; Technical Specification Group Radio Access Network; NR; "Multiplexing and channel coding"; (Release 16); 3GPP TS 38.212 V16.2.0; Jun. 2020.
3rd Generation Partnership Project; Technical Specification Group Radio Access Network; NR; "Physical layer procedures for data"; (Release 15); 3GPP TS 38.214 V15.10.0; Jun. 2020.
3rd Generation Partnership Project; Technical Specification Group Radio Access Network; NR; "Physical layer procedures for data"; (Release 16); 3GPP TS 38.214 V16.2.0; Jun. 2020.
International Preliminary Report on Patentability dated Feb. 7, 2023 in connection with Application Serial No. PCT/US2021/04726.
International Search Report and Written Opinion Dated Nov. 23, 2021 for International Application PCT/US2021/043726.
Qualcomm Incorporated; Remaining details on QCL; 3GPP TSG WG1 Meeting #91; R1-1720672.

* cited by examiner

| Value of BSR field | Description |
|---|---|
| '00' | No beam switching |
| '01' | Switching to SSSG index 1 configured by higher layer for serving cell c |
| '10' | Switching to SSSG index 2 configured by higher layer for serving cell c |
| '11' | Switching to SSSG index 3 configured by higher layer for serving cell c |

*FIG. 6*

PHYSICAL DOWNLINK CONTROL CHANNEL TRANSMISSION IN WIRELESS COMMUNICATION

CROSS-REFERENCE TO RELATED APPLICATIONS

This application is a National Phase entry application of International Patent Application No. PCT/US2021/043726 filed Jul. 29, 2021, which claims the benefit of U.S. Provisional Patent Application 63/061,546 filed Aug. 5, 2020, entitled "USER EQUIPMENT (UE) PHYSICAL DOWNLINK CONTROL CHANNEL TRANSMISSION IN WIRELESS COMMUNICATION", and U.S. Provisional Patent Application 63/061,577 filed Aug. 5, 2020, entitled "NETWORK DEVICE PHYSICAL DOWNLINK CONTROL CHANNEL TRANSMISSION IN WIRELESS COMMUNICATION", the contents of which are herein incorporated by reference in their entirety.

FIELD

The present disclosure is in the field of wireless communication, and more specifically, pertains to physical downlink control channel (PDCCH) transmission.

BACKGROUND

In general, a UE can monitor a set of Physical Downlink Control Channel (PDCCH) candidates in one or more control resource sets (CORESETs) on an active downlink (DL) bandwidth part (BWP) on each activated serving cell according to corresponding search spaces, where monitoring implies or refers to decoding (or attempting to decode) some or all PDCCH candidates in the PDCCH candidate set according to the monitored Downlink Control Information (DCI) formats. A set of PDCCH candidates for a UE to monitor can be defined in terms of PDCCH search spaces. A search space can be a common search space (CSS) or a UE-specific search space (USS). According to current NR implementations, a UE can monitor PDCCH candidates in non-discontinuous reception (DRX) slots (or slots) in one or more of the various defined search spaces.

For PDCCH monitoring purposes, each BWP configured to a UE can be associated with a number of control resource sets (CORESETs) and up to ten search space sets, for example. In particular, the number of PDCCH candidates per aggregation level (AL) can be independently configured among $\{0, 1, 2, 3, 4, 5, 6, 8\}$ for each search space (SS). Monitoring periodicities of different SS sets can be different and be selected from a set of possible values given as $\{1, 2, 4, 5, 8, 10, 16, 20\}$ slots, for example.

Ideally, a UE could be capable of monitoring PDCCH candidates configured by the next generation NodeB (gNB) so that optimal scheduling flexibility can be achieved. UE velocity oriented mobility management for long term evolution (LTE) or new radio (NR) networks for high speed trains (e.g., high-speed rails with rail transportation capable of about 200 kilometers per hour/120 miles per hour) and other such devices are also demanding better coverage along the railway to better serve the users on high speed train. The so-called High-speed-railway dedicated "network" (or an HST non-station cell) can be different in eNodeB (eNB) or gNB functionality and network structure than the network deployed for normal ground users or low-medium mobility users.

BRIEF DESCRIPTION OF THE DRAWINGS

FIG. 6 is an illustration of example downlink control information (DCI) field in accordance with various aspects.

DETAILED DESCRIPTION

Figure 1:
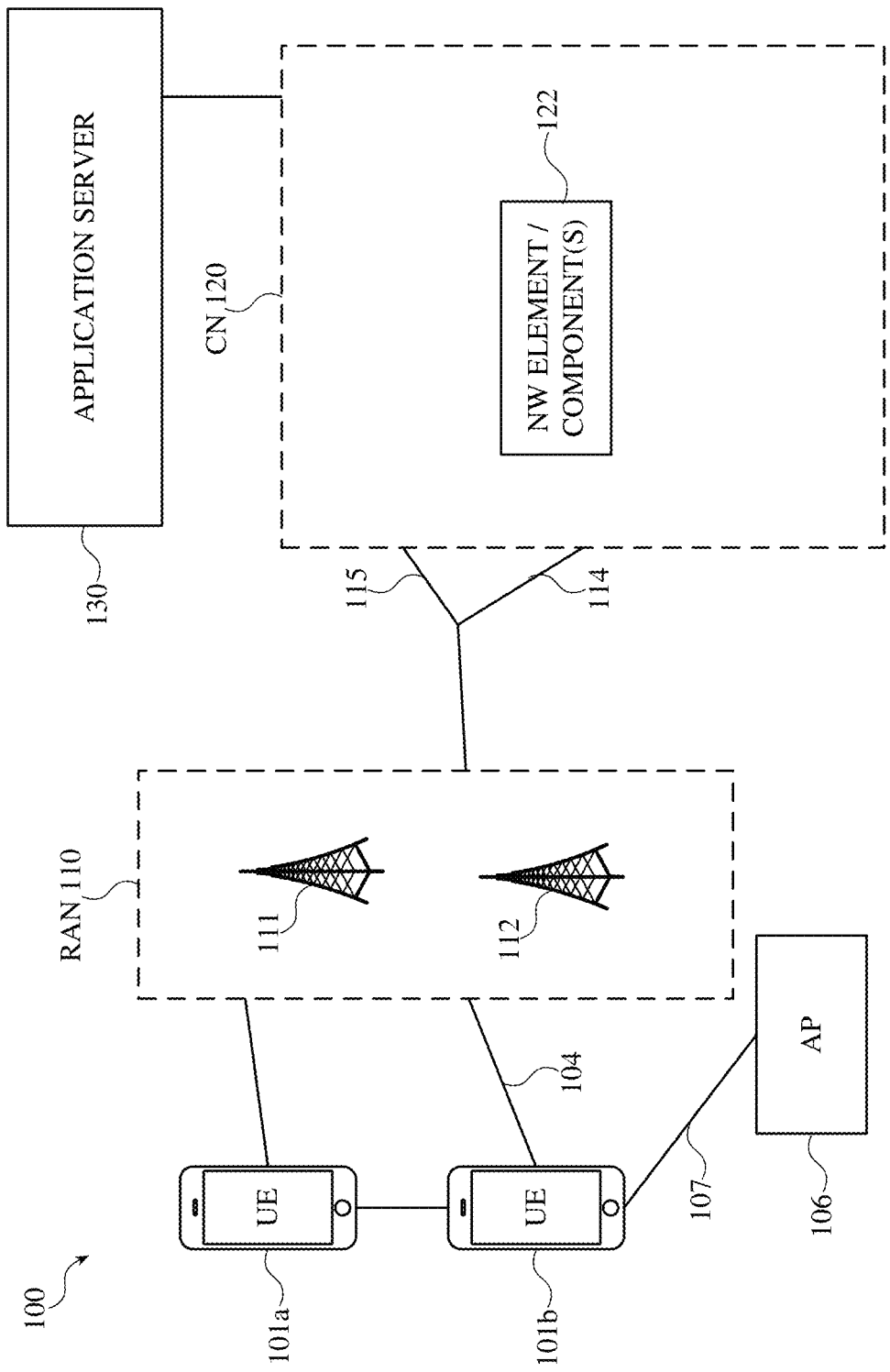
FIG. 1 is an exemplary block diagram illustrating an example of user equipment(s) (UEs) communicatively coupled a network with network components as peer devices useable in connection with various aspects described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like (or similarly ending) reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

In consideration of various concerns for operating new radio (NR) 5G communications, to ensure optimal scheduling flexibility with increased reliability and coverage performance, various aspects (embodiments) are described. The network generally can indicate a transmission configuration indicator (TCI) state for physical downlink control channel (PDCCH) reception for a control resource set (CORESET) of a serving cell by sending a TCI state indication by a UE-specific PDCCH MAC control element (CE). More specially, a MAC CE was introduced to activate/deactivate UE-specific PDCCH MAC CE, which can have a fixed size (e.g., 16 bits, or the like) with following fields: serving cell ID, CORESET ID and TCI State identifier (ID). An issue with CORESET-based TCI signaling framework is that time-domain beam sweeping for search spaces associated with a single CORESET can be restricted. However, one CORESET configuration could be a typical use case for reduced capability (RedCap) devices due to reduced bandwidth. Hence, there is a clear need to provide a search space sets (SSSs) beam sweeping mechanism to improve the reliability and coverage performance in cases of a single CORESET, especially for RedCap devices having a reduced number of antennas and bandwidth such as in a high-speed train deployment scenario.

In an aspect, a UE can receive a search space information element (IE) for a PDCCH. A TCI state can be configured according to a TCI state identifier (ID) in the search space IE. The UE can determine a TCI state to enable beam switching across different PDCCH monitoring occasions based on the search space IE for a search space (e.g., a UE-specific search space (USS)). Each TCI state can include parameters for configuring a quasi co-location (QCL) relationship between one or more downlink reference signals (e.g., sounding reference signal (SRS), or the like) and the demodulation reference signals (DM-RS) antenna port for PDCCH reception in the USS. In particular, the TCI state ID can indicate one of a set of TCI states configured for the corresponding CORESET to determine the QCL relationship between the PDCCH DM-RS ports of the search space and the DL reference signal(s) (RS(s)) in an RS set for a TCI state.

Alternatively, or additionally, the UE can determine a number of UE-specific search space (USS) repetitions for PDCCH repetitions associated with a control resource set (CORESET) for the one or more TCI states based on a PDCCH repetition field of the search space IE. The PDCCH-Repetition field of the search space IE can indicate a repetition number over consecutive PDCCH monitoring occasions, for example, as slot-based or mini-slot based repetition. The PDCCH repetition field can be configured in the search space IE independently, or in combination with, a TCI state ID.

A UE as a high-speed train (HST) device, other RedCap device, or as a network device can operate to receive a search space set group (SSSG) index of an SSSG that is associated with one or more search space sets (SSSs) to monitor the PDCCH on a serving cell. Each SSS can be configured with one or more TCI states. The UE can then operate to perform SSSG-based beam switching based on a downlink control information (DCI) format. The DCI format can be a particularly unique DCI format for DCI based on a dedicated radio network temporary identifier (RNTI) according to various aspects. Additional aspects and details of the disclosure are further described below with reference to figures.

FIG. 1 illustrates an example architecture of a system 100 of a network, in accordance with various embodiments (aspects). The following description is provided for an example system 100 that operates in conjunction with the LTE system standards and 5G or NR system standards as provided by 3GPP technical specifications. However, the example embodiments are not limited in this regard and the described embodiments can apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101*a* and UE 101*b* (collectively referred to as "UEs 101" or "UE 101"). UEs 101 can be configured as smartphones (e.g., handheld touchscreen mobile computing devices connectable to one or more cellular networks), but can comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, high speed train (HST) device, other RedCap device, or the like.

In some embodiments, any of the UEs 101 can be IoT UEs, which can comprise a network access layer designed for low-power IoT applications utilizing short-lived UE connections. An IoT UE can utilize technologies such as M2M or MTC for exchanging data with an MTC server or device via a public land mobile network (PLMN), Proximity Services (ProSe) or Device-to-Device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 can be configured to connect, for example, communicatively couple, with a Radio Access Network (RAN) 110. In embodiments, the RAN 110 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communications interface/layer.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 can be configured to utilize LTE-WLAN aggregation (LWA) operation and/or LTE-WLAN Radio Level Integration with IPsec Tunnel (LWIP) operation. The LWA operation can involve the UE 101b in radio resource control RRC_CONNECTED being configured by a RAN node 111a-b to utilize radio resources of LTE and WLAN. LWIP operation can involve the UE 101b using WLAN radio resources (e.g., connection 107) via IPsec protocol tunneling to authenticate and encrypt packets (e.g., IP packets) sent over the connection 107. IPsec tunneling can include encapsulating the entirety of original IP packets and adding a new packet header, thereby protecting the original header of the IP packets.

The RAN 110 can include one or more access nodes (ANs) or RAN nodes 111a and 111b (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). As used herein, the term "NG RAN node" or the like can refer to a RAN node 111 that operates in an NR or 5G system 100 (for example, a gNB), and the term "E-UTRAN node" or the like can refer to a RAN node 111 that operates in an LTE or 4G system 100 (e.g., an eNB). According to various embodiments, the RAN nodes 111 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 can be implemented as one or more software entities running on server computers as part of a virtual network, which can be referred to as a centralized RAN (CRAN) and/or a virtual baseband unit pool (vBBUP). In these embodiments, the CRAN or vBBUP can implement a RAN function split, such as a Packet Data Convergence Protocol (PDCP) split wherein Radio Resource Control (RRC) and PDCP layers are operated by the CRAN/vBBUP and other L2 protocol entities are operated by individual RAN nodes 111; a Media Access Control (MAC)/Physical (PHY) layer split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 can represent individual gNB-Distributed Units (DUs) that are connected to a gNB-Control Unit (CU) via individual F1 interfaces. In these implementations, the gNB-DUs can include one or more remote radio heads or RF front end modules (RFEMs), and the gNB-CU can be operated by a server that is located in the RAN 110 (not shown) or by a server pool in a similar manner as the CRAN/vBBUP. Additionally or alternatively, one or more of the RAN nodes 111 can be next generation eNBs (ng-eNBs), which are RAN nodes that provide E-UTRA user plane and control plane protocol terminations toward the UEs 101, and are connected to a 5GC via an NG interface.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes 111 over a multicarrier communication channel in accordance with various communication techniques, such as, but not limited to, an OFDMA communication technique (e.g., for downlink communications) or a Single Carrier Frequency-Division Multiple Access (SC-FDMA) communication technique (e.g., for uplink and ProSe or sidelink communications), although the scope of the embodiments (aspects) is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum can include channels that operate in the frequency range of approximately 400 MHz to approximately 2.8 GHz, whereas the unlicensed spectrum can include the 5 GHz band.

To operate in the unlicensed spectrum, the UEs 101 and the RAN nodes 111 can operate using Licensed Assisted Access (LAA), eLAA, and/or feLAA mechanisms. In these implementations, the UEs 101 and the RAN nodes 111 can perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations can be performed according to a listen-before-talk (LBT) protocol.

The PDSCH carries user data and higher layer signaling to the UEs 101. The physical downlink control channel (PDCCH) carries information about the transport format and resource allocations related to the PDSCH channel, among other things. It can also inform the UEs 101 about the transport format, resource allocation, and Hybrid Automatic Repeat Request (HARQ) information related to the uplink shared channel. Typically, downlink scheduling (assigning control and shared channel resource blocks to the UE 101*b* within a cell) can be performed at any of the RAN nodes 111 based on channel quality information fed back from any of the UEs 101. The downlink resource assignment information can be sent on the PDCCH used for (e.g., assigned to) each of the UEs 101.

The PDCCH uses control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, 8, or 16).

The RAN nodes 111 can be configured to communicate with one another via interface 112. In embodiments where the system 100 is an LTE system, the interface 112 can be an X2 interface 112. The X2 interface can be defined between two or more RAN nodes 111 (e.g., two or more eNBs and the like) that connect to evolved packet core (EPC) or core network 120, and/or between two eNBs connecting to EPC 120. In some implementations, the X2 interface can include an X2 user plane interface (X2-U) and an X2 control plane interface (X2-C). The X2-U can provide flow control mechanisms for user data packets transferred over the X2 interface, and can be used to communicate information about the delivery of user data between eNBs. For example, the X2-U can provide specific sequence number information for user data transferred from a master eNB (MeNB) to an secondary eNB (SeNB); information about successful in sequence delivery of PDCP packet data units (PDUs) to a UE 101 from an SeNB for user data; information of PDCP PDUs that were not delivered to a UE 101; information about a current minimum desired buffer size at the SeNB for transmitting to the UE user data; and the like. The X2-C can provide intra-LTE access mobility functionality, including context transfers from source to target eNBs, user plane transport control, etc.; load management functionality; as well as inter-cell interference coordination functionality.

In embodiments where the system 100 is a 5G or NR system, either with a coexisting Radio Access Technology (RAT) or not, the interface 112 can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support can include context transfer from an old (source) serving RAN node 111 to new (target) serving RAN node 111; and control of user plane tunnels between old (source) serving RAN node 111 to new (target) serving RAN node 111. A protocol stack of the Xn-U can include a transport network layer built on Internet Protocol (IP) transport layer, and a GPRS Tunnelling Protocol for User Plane (GTP-U) layer on top of a User Datagram Protocol (UDP) and/or IP layer(s) to carry user plane PDUs. The Xn-C protocol stack can include an application layer signaling protocol (referred to as Xn Application Protocol (Xn-AP)) and a transport network layer that is built on Stream Control Transmission Protocol (SCTP). The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

The RAN 110 is shown to be communicatively coupled to a core network—in this embodiment, core network (CN) 120. The CN 120 can comprise a plurality of network elements 122, which are configured to offer various data and telecommunications services to customers/subscribers (e.g., users of UEs 101) who are connected to the CN 120 via the RAN 110. The components of the CN 120 can be implemented in one physical node or separate physical nodes including components to read and execute instructions from a machine-readable or computer-readable medium (e.g., a non-transitory machine-readable storage medium). In some embodiments, NFV can be utilized to virtualize any or all of the above-described network node functions via executable instructions stored in one or more computer-readable storage mediums (described in further detail below). A logical instantiation of the CN 120 can be referred to as a network slice, and a logical instantiation of a portion of the CN 120 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more Evolved Packet Core (EPC) components/functions.

Generally, the application server 130 can be an element offering applications that use IP bearer resources with the core network (e.g., Universal Mobile Telecommunications System Packet Services (UMTS PS) domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 can be a 5GC (referred to as "5GC 120" or the like), and the RAN 110 can be connected with the CN 120 via an NG interface 112. In embodiments, the NG interface 112 can be split into two parts, an Next Generation (NG) user plane (NG-U) interface 114, which carries traffic data between the RAN nodes 111 and a User Plane Function (UPF), and the S1 control plane (NG-C) interface 115, which is a signaling interface between the RAN nodes 111 and Access and Mobility Management Functions (AMFs). The Core network CN 120 can also be a 5GC 120.

In embodiments, the CN 120 can be a 5G CN (referred to as "5GC 120" or the like), while in other embodiments, the CN 120 can be an evolved packet core (EPC)). Where CN 120 is an EPC (referred to as "EPC 120" or the like), the RAN 110 can be connected with the CN 120 via an S1 interface 112. In embodiments, the S1 interface 112 can be split into two parts, an S1 user plane (S1-U) interface 114, which carries traffic data between the RAN nodes 111 and the S-GW, and the S1-MME interface 115, which is a signaling interface between the RAN nodes 111 and MMEs.

Figure 2:
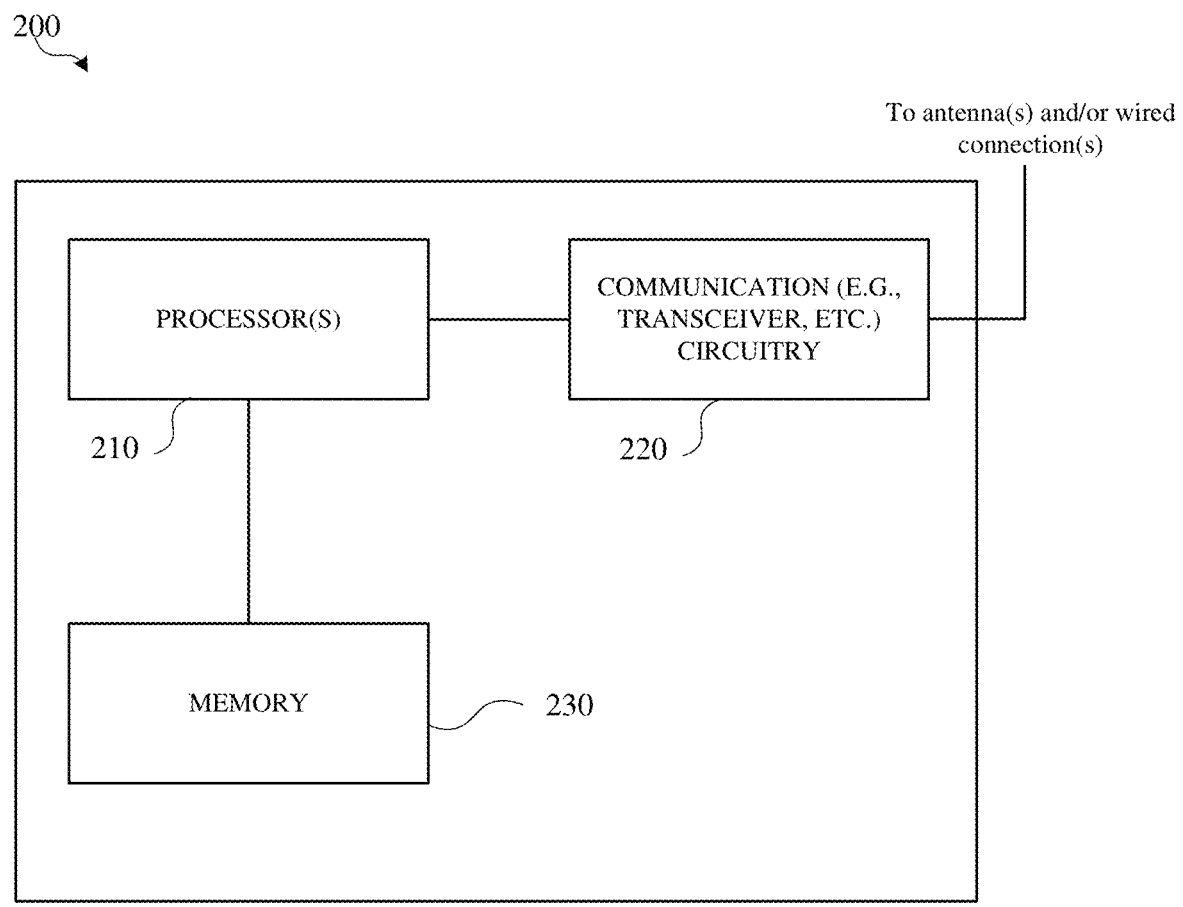
FIG. 2 is an exemplary a simplified block diagram of a user equipment (UE) wireless communication device or other network device/component (e.g., eNB, gNB) in accordance with various aspects.

Referring to FIG. 2, illustrated is a block diagram of a user equipment (UE) device or other network device/component (e.g., gNB, eNB, or other participating network entity/component). The device 200 includes one or more processors 210 (e.g., one or more baseband processors) comprising processing circuitry and associated interface(s), transceiver circuitry 220 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 230 (which can comprise any of a variety of storage mediums and can store instructions and/or data associated with one or more of processor(s) 210 or transceiver circuitry 220).

In addition, the memory 230 (as well as other memory components discussed herein, e.g., memory, data storage, or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. As described in greater detail below, system 400 can facilitate greater power efficiency for beam management operations, including CSI reporting/feedback based on a hierarchical precoding scheme.

According to various aspects, the UE 300/101 or gNB 300/110 can operate to configure or process a search space IE for a PDCCH. The search space IE can include a TCI-state ID that indicates at least one TCI state from among a plurality of TCI states. For each UE-specific search space (USS), the UE 101 can be provided with an antenna port quasi-co-location, from a set of antenna port quasi co-locations provided by the TCI state. The TCI state thus indicates the quasi co-location information of the DM-RS antenna port for PDCCH reception in a respective USS. The TCI state further enables beam switching to be performed across different PDCCH monitoring occasions.

The UE 101 can further receive and process a search space set group (SSSG) index of an SSSG that is associated with one or more search space sets (SSSs) to monitor the PDCCH on a serving cell. Each SSS can be configured with one or more TCI states by belonging to different SSSGs, for example. The UE can then operate to perform SSSG-based beam switching based on a downlink control information (DCI) format.

Figure 3:
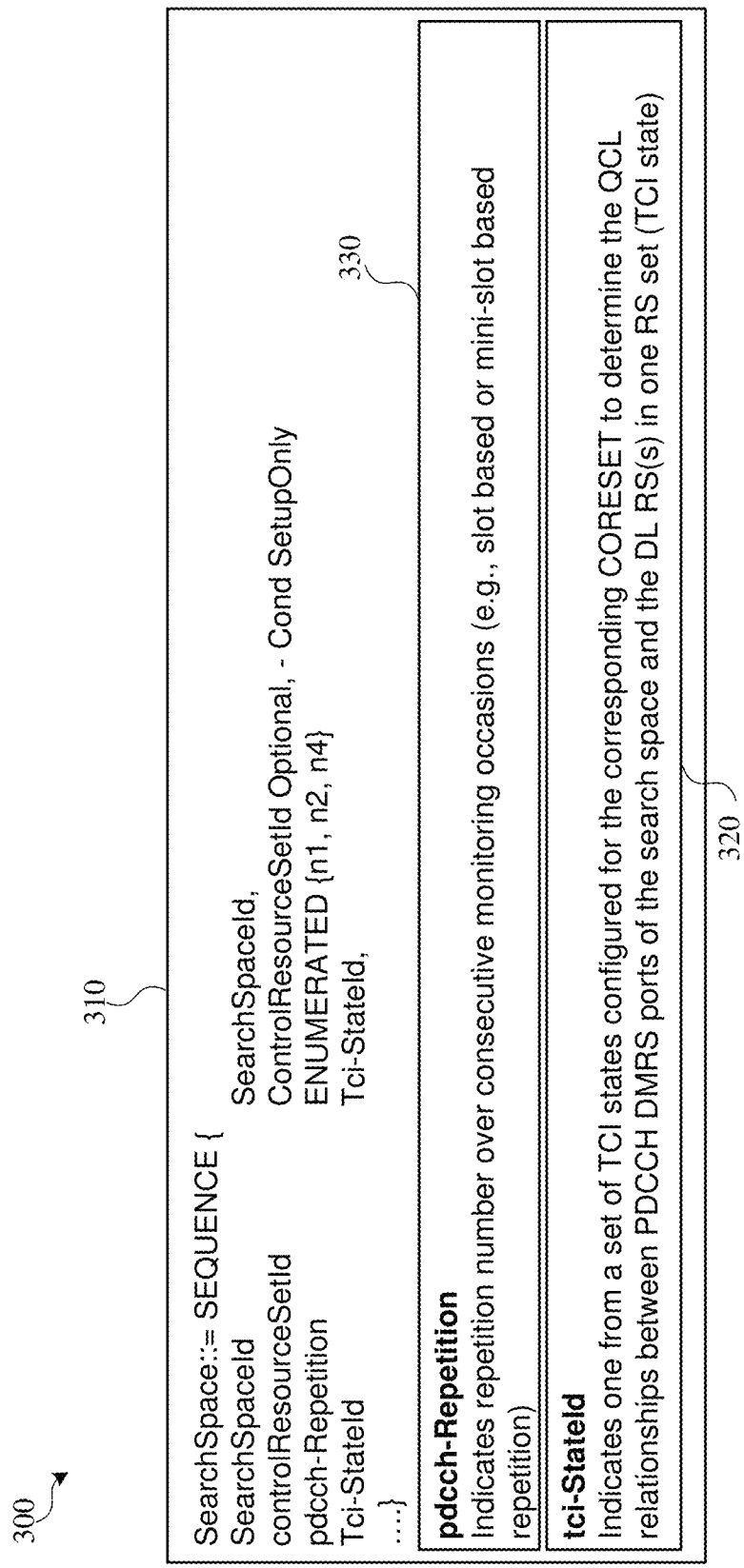
FIG. 3 is an illustration of an example search space information element (IE) in accordance with various aspects.

Referring to FIG. 3, illustrated is an example search space configuration 300 in accord with various aspects. A search space configuration 300 can include a search space IE 310 with one or more fields or data items comprising at least one of: a TCI-state ID field 320 or a PDCCH repetition field 330. Although fields or elements including the TCI state ID field 320 and the PDCCH repetition field 330 are illustrated, the search space IE 310 can include one field 320 or 330, or both fields 320 and 330, as well as one or more other fields or data items therein as indicated data that is further part of the search space IE 310. A search space is indicated as a sequence type as well as a search space ID and a particular CORESET ID, which can be provided by the search space IE 310.

In Rel-15, the network may indicate a TCI state for PDCCH reception for a CORESET of a Serving Cell by sending the TCI State Indication for UE-specific PDCCH MAC CE. More specially, one MAC CE was introduced to activate/deactivate UE-specific PDCCH MAC CE, which can have a fixed size (e.g., 16 bits or the like) with the following fields: serving cell ID, CORESET ID and TCI State ID. An issue related to CORESET-based TCI signaling framework is that it can prohibit time-domain beam sweeping for search spaces associated with a single CORESET. Such a CORESET configuration may be a typical use case for RedCap devices due to reduced bandwidth. However, when beam switching the reassociation uses the MAC CE between the COREST with other TCI states. In cases where the UE 101 operates at high speed and could have a limited bandwidth (e.g., less than 20 MHz), only one CORESET can be typical configured, which means switching to another beam direction where another MAC CE is utilized to do the reassociation between the CORESET and other TCI states. This can take a long time relatively. Hence, there is a clear need to provide search space set (SSS) sweeping mechanism to improve the reliability and coverage performance in case of single CORESET, especially for RedCap devices with reduced number of antennas and bandwidth in a high-speed train deployment scenario For the NR PDCCH monitoring two configuration parameters can be utilized: one indicating CORESET information, and another to configure an SSS, which indicates the time domain information such as a spectral density estimation, monitoring occasion(s), or the like. However, the CORESET does not necessarily indicate a hand-off transmission block in the frequency domain or a duration for one transmission occasion. Rather, such information regarding transmission occasions within a certain period can be configured by the SSS configuration, which configures multiple search spaces (SS)s for multiple aggregation levels in NR.

In an aspect, the search space IE 310 can include the TCI-state ID field 320, the PDCCH repetition field 330, or both. The TCI state ID 320 indicates one of one or more TCI states configured for a corresponding CORESET to determine QCL relationships between the PDCCH DM-RS ports of the search space and the DL RS(s) in one RS set. In addition, for each USS, the UE 101 can be provided a number of consecutive monitoring occasions within a monitoring period using either a bitmap or a start and length indicator value (SLIV) based signaling approach. The TCI state further enables beam switching to be performed across different PDCCH monitoring occasions. The TCI state ID 320 can indicate which SRS that can used for cross correlation. For example, if there is a different beam for transmission/reception, then the TCI state can indicate which reference signal the Tracking Reference Signal (TRS) or Synchronization Signal Block (SSB) can be used to estimate from which beam particular special information derives from.

Alternatively, or additionally, the search space IE 310 can be configured with the PDCCH repetition field 330 that indicates a number of repetitions over consecutive monitoring occasions, as a slot-based or a mini-slot based repetition. The UE 101 can determine a number of UE-specific search space (USS) repetitions for the PDCCH repetitions associated with a CORESET for the one or more TCI states based on a PDCCH repetition field 330 of the search space IE 310. The PDCCH repetition field 330 can be configured in the search space IE 310 independently, or in combination with, the TCI state ID 320.

Figure 4:
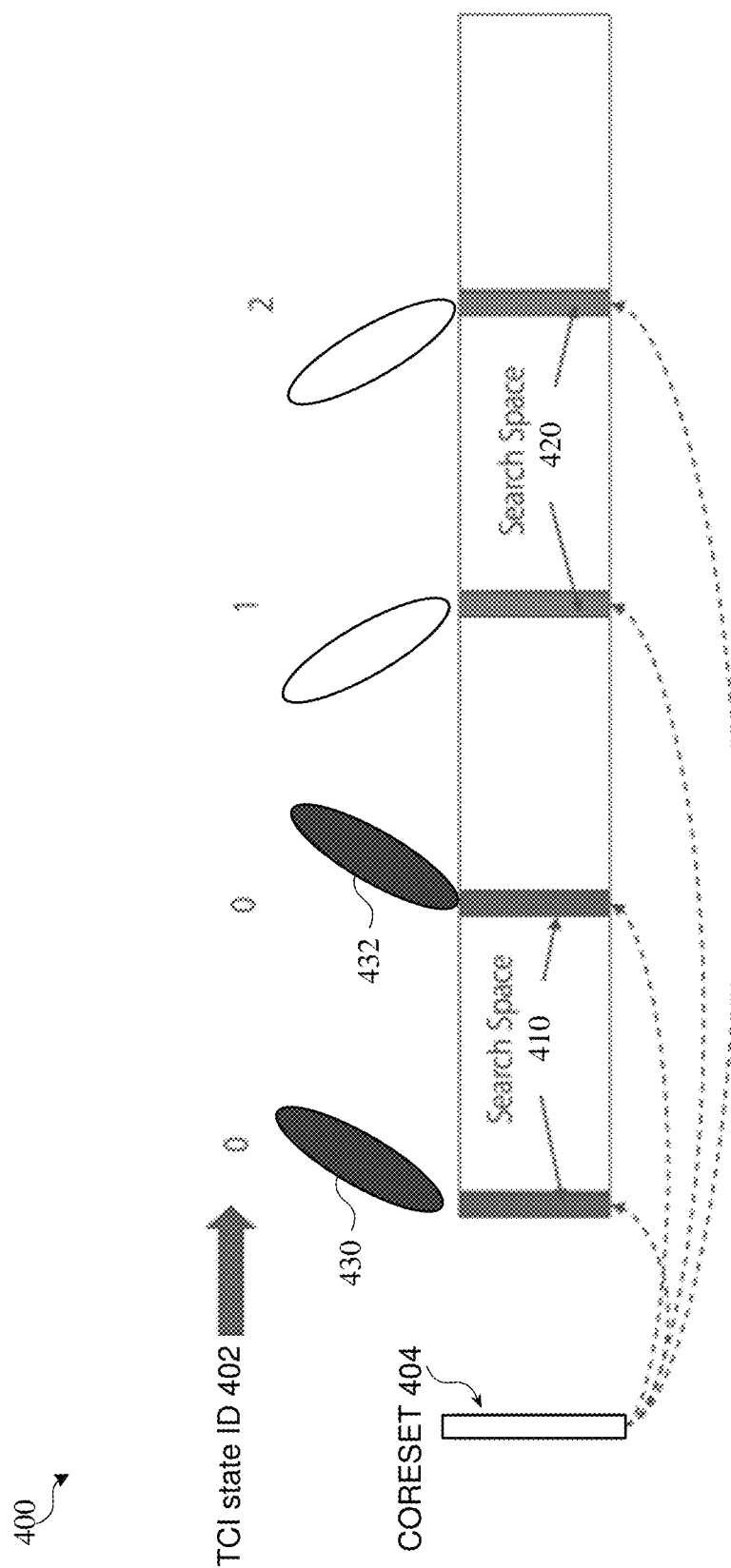
FIG. 4 is an illustration of an example signaling 400 to enable beam switching with a control resource set (CORESET) in accord with various aspects.

Referring to FIG. 4, illustrated is an example signaling 400 to enable beam switching in accord with various aspects. Separate TCI states can be indicated by the TCI state ID field 402 for PDCCH repetition across search spaces 410 and 420 associated with a same CORESET 404. The signaling 400 is an example of USS repetition for a multi-TPR scenario or multi-beam operation (e.g., on frequency range 2 (FR2)) assuming a repetition factor (i.e. setting the PDCCH-repetition IE field 330 to be 'n2' from among different factors). Both USS 410 and 420 can be associated with a same CORESET 404 but configured with different TCI states as indicated by the TCI state ID field 402 in one or more UE search space IEs 300.

PDCCH transmission for a RedCap device, for example, can be associated with only one CORESET 404. The CORESET 404 can be associated with different search spaces 410, 420, and additionally with a search space repetition (e.g., UE search space repetition). Both the UE 101 and gNB 111 can align the understanding of these two occasions to transmit repeatedly by a repeated DCI format at the search spaces 410, or 420. For example, one DCI can be transmitted in the first transmission occasion 430, and then a repeated DCI transmitted in the second transmission occasion 432. The UE 101 can then perform decoding by joining/combining these two transmission occasions 430 and 432 together. Likewise, a similar transmission repetition can be configured according to the PDCCH repetition field 330 in the SS 420.

In an aspect, each SS 410 and 420 can be associated with a PDCCH repetition 330, for example. By obtaining a time domain occasion, the first two occasions can be derived, and each set of repetitions or repetition can be associated with a different TCI state 402. A single TCI state associated with a single CORESET 404 is not necessarily effective enough, especially considering RedCap devices. If the bandwidth starts with only one TCI state, beam switching flexibility can be lost when doing beam switching at high speeds when the MAC CE is being used to re-associate a TCI with only one CORESET. As such, faster signaling for beam sweeping with TCI adaptation can be utilized by utilizing the repetition and TCI fields 310 and 320 of search space IE 400 based on the location of the high speed device or train.

Figure 5:
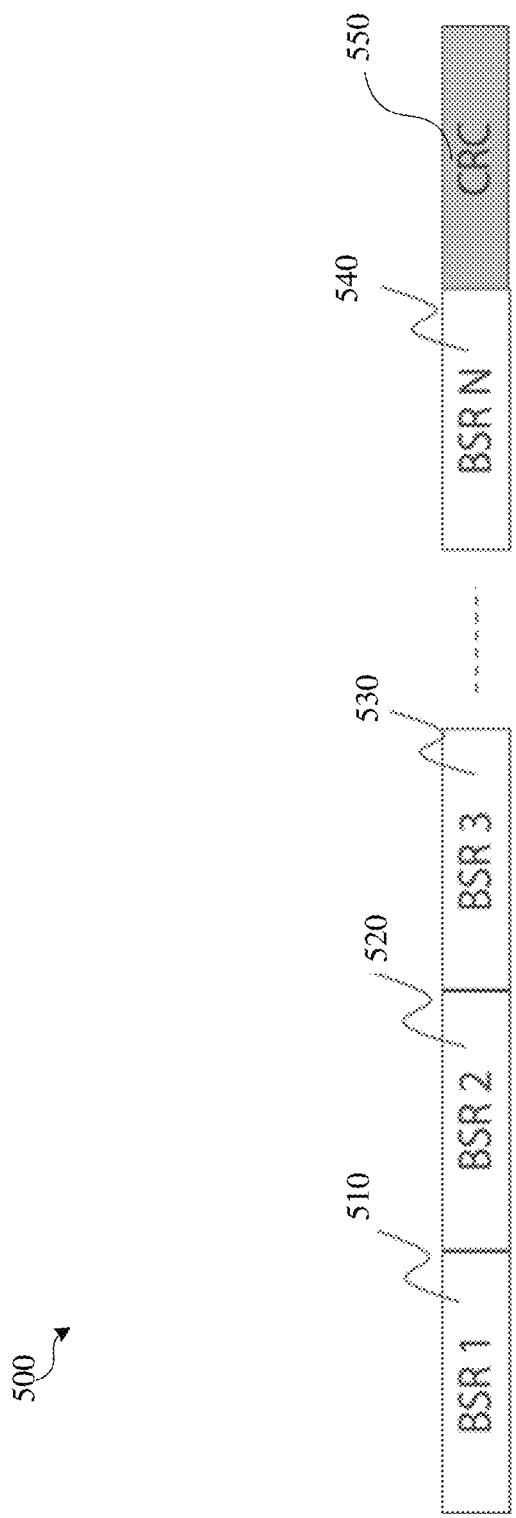
FIG. 5 is an illustration of an example group-based switching in accordance with various aspects.

Referring to FIG. 5, illustrated is an example of a DCI format X for group-based fast beam switching operation in accord with various aspects. A DCI 500 can be configured with a number (N) of beam sweeping request (BSR) fields. One or more BSR fields 510 thru 540, for example, can be configured with a location or an index of a serving cell in order to further enable group based beam switching for PDDCH. The UE 101 can be provided a group index or a search space set group index for a respective search space set (SSS) for PDCCH monitoring on a serving cell. Each search space set group (SSSG) can be associated with {TCIx, TCIy, . . . , TCIz}—pairs so that one or more TSI states are associated with each SSS of an SSSG. Each search space of an SSS can be linked to an aggregation level, and thus, the UE 101 can be configured with multiple aggregation levels and multiple search spaces in an SSS, for example, as well as one or more TCI states associated with an SSSG. A search space set or SSS in particular can be configured with different PDCCH monitoring occasions in a time domain, which can still operate it more than one service type because there is more than one SSS for each of the SSSGs. SSSG based beam switching can thus enable a greater flexibility over beam switching per SS, for example.

In an aspect, the UE 101 can be provided a serving cell group list (e.g., ServingCellGroupList) that indicates the SSSGs of serving cells. The SSSGs can be used to apply SSSG beam switching simultaneously, especially as the UE 101 transitions along different locations with different serving cells as in a high speed train scenario. The serving cell group list configured the SSSGs with different search space sets or SSSs can be provided by an RRC signaling or higher layer signaling.

In various aspects, a unique dedicated DCI format can be configured to trigger SSSG-based beam switching. Each SSS can be associated with a particular SSSG, and the SSSG can have different search space sets or subset groups of search space sets, which can be configured differently for each serving cell as part of a PDCCH configuration, for example, by a dedicated signaling with a UE specific search space, where, for example, up to 10 SSS can be configure per bandwidth part.

For example, a DCI Format X can be configured for group-based beam switching triggering to include BSR fields: Beam Switching Request 1 (BSR 1) 510, Beam Switching Request 2 (BSR 2) 520, Beam Switching Request 3 (BSR3) 530 . . . Beam Switching Request N (BSR N) 540, wherein N is an integer (e.g., an integer greater than one). Any one or more of BSR fields 510 thru 540, for example, can indicate a PDCCH to be used for a beam according to the bit field. In particular, the BSR field bits relate to an SSSG, which is associated with a PDCCH. A SS is associated with or paired with a TCI state. One SSS can be associated with one or more TCI states among different SSSGs. The DCI format X 500 with BSR fields can be configured with a dedicated RNTI such that the DCI is scrambled or encoded according to the RNTI (e.g., X-RNTI), for example.

In an aspect, the DCI format including one or more BSR fields 310 thru 340 can be configured to trigger SSSG-based beam switching for the PDCCH, and additionally at least one of the PDSCH and an uplink transmission (e.g., a physical uplink shared channel (PUSCH)). In this manner, when a BSR field of the DCI 500 indicates an SSSG changes at a particular location or index of a serving cell for a PDCCH, the PDCCH can be provided in a different TCI state for a different beam. This different beam can also be used for similarly switching for the PDSCH, the PUSCH, or both along with the PDCCH, for example.

In an aspect, a size of the DCI format X can be configured to be aligned with the payload size of a legacy DCI Format (e.g., a DCI Format 1-0, or a fallback DCI) to avoid increasing the blind decoding attempts at UE side. The legacy DCI format can be a smaller DCI format relatively in order to decrease blind decoding attempts or at least not introduce further blind decoding attempts with the functionality of various aspects described herein. To differentiate with other DCI Format 500 having a same payload size, the CRC 550 of the DCI Format X 500 can be scrambled by the dedicated RNTI (e.g., X-RNTI), which can be used to differentiate the DCI 500 with the aligned legacy or fallback DCI.

Referring to FIG. 6, illustrated is an example of a BSR field 600 in the DCI format X in accord with various aspects. The BSR fields 510 thru 540 of the DCI format X 500 of FIG. 5 can be configured with a BSR field value according to a plurality of bits (e.g., two bits or the like) and a description or indication of an SSSG index for SSSG based beam switching. The UE 101 can be configured with a location or index of a BSR field for a serving cell in the DCI Format X 500 to switch SSSGs that are associated with different TCI states to enable SSSG based beam switching across different PDCCH monitoring occasions. The location or index value of the BSR field for the serving cell can configured according to RRC signaling or higher layer signaling, for example. Accordingly, the UE 101 can switch to a different SSSG based on a BSR field value.

In an aspect, one BSR field value (e.g., '00') can indicate that no beam switching is performed. Other fields can indicate the SSSG index configured by higher layer signaling for the serving cell by which the UE 101 can switch to. Different DCI can thus be provided to trigger the UE 101 to switch to a different search space based on the SSSG index or group index configured for a given serving cell, unless the BSR value indicates that no switching is needed. For a certain period, the UE 101 may still be within rate of same of a same search space, or the same beam. In this case the monitoring occasion can still be operable and the gNB 111 still transmits the DCI, but no change in the beam may be needed. Thus, when the gNB 111 configures the DCI, the field can be set to '00', for example, or other value indicating no switching is needed. This can account for a varied the car or UE device rate of a certain beam, in which for certain monitoring occasion (PDCCH monitoring occasion) the same beam is utilized compared to an early monitoring occasion.

Assuming BSR field size can be K bits, where K can be an integer of two or greater, for example, the UE 101 can start monitoring PDCCH according to search space sets associated with an SSSG index according to the value of BSR field. SSSG based beam switching can be based on the received 2-bit BSR field (i.e. K=2) in a group-common DCI Format X 500. The UE 101 starts monitoring PDCCH according to SSSG indicated by BSR field 600 on the serving cell or serving cell group at a first slot that can be at least Z symbols, wherein Z is an integer number after the last symbol of the PDCCH with the DCI format X. This can operate to provide the gNB 111 flexibility so that different SSS within a group index can be based on the information predicted at the gNB side and switching can be done to a target beam so that the associated target SSSG can use a different associated BSR field value.

Figure 7:
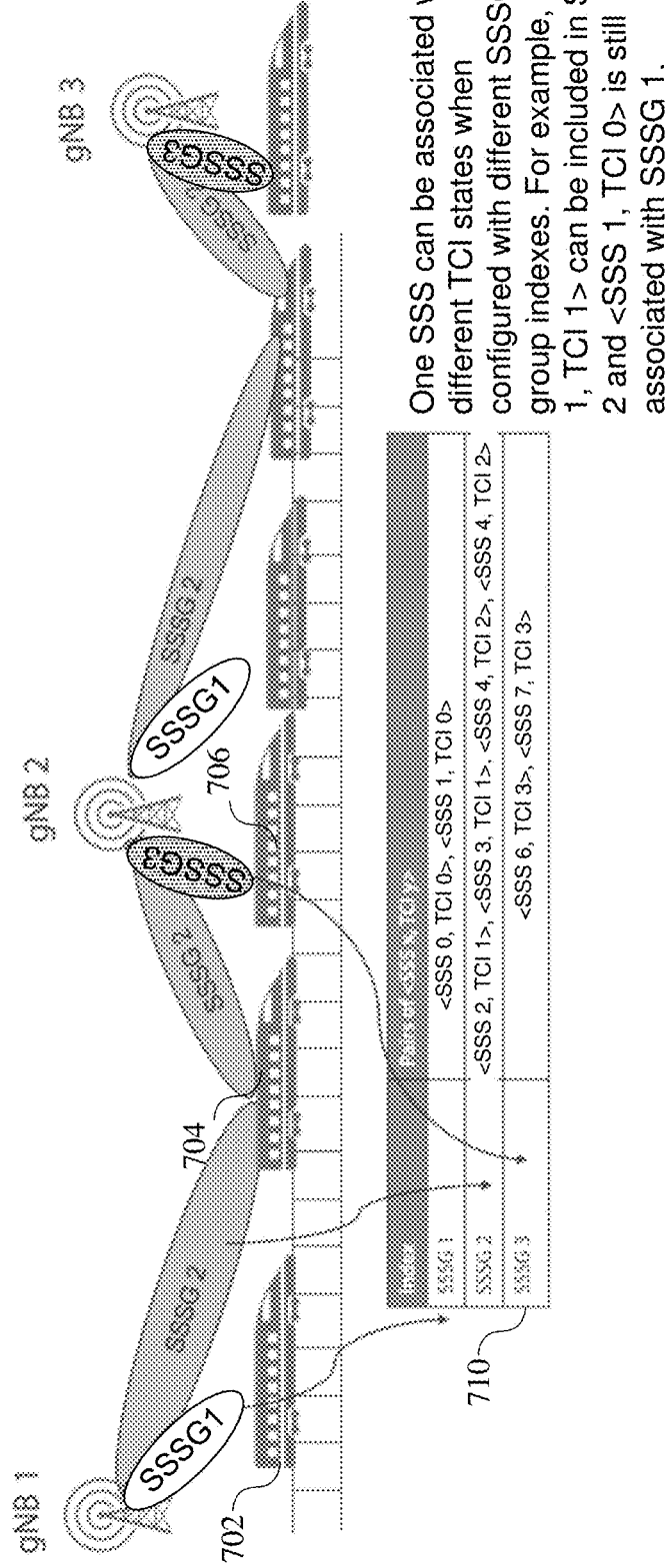
FIG. 7 is an illustration of another example of group-based switching in accordance with various aspects.

Referring to FIG. 7, illustrated is an example of group based beam switching for PDCCH transmission in accord with various aspects. A UE 101 can be configured as a high speed train 702, or multiple high speed trains 704 and 706 traveling at different locations and rates. An example of SSSG configuration is provided with table configuration 710, which includes pairing of two parameters: an SSS index and a TCI index.

In various aspects, one SSS can be configured with more than one TCI state to enable SSS beam sweeping across different monitoring occasions (e.g., PDCCH monitoring occasions) by associating the SSS with different TCI state in different SSSG index. As one example, SSS index 1 can be associated with TCI 0 in SSSG 1. While it is associated with TCI state 1 in SSSG 2. With this approach, SSS sweeping can be achieved by triggering SSSG based beam switching (e.g., switching from SSSG 1 to SSSG 2 by setting the BSR state or field value (e.g., 510) to '10' in DCI Format X 500). Thus, one SSS can be associated with different TCI states when configured with different SSSG group indexes. For example, <SSS 1, TCI 1> can be included in SSSG 2 and <SSS 1, TCI 0> is still associated with SSSG 1. This enables at least a partial overlap among the SSS index across different groups, where one SSS can be associated with different SSSGs by different TCI states. Associating the SSS with different TCI states and different beam can be in a same time domain monitoring occasion configuration. Rather than associated an SSS with a CORESET, the SSS can be associated with different TCI states and enable a flexibility of the SSS configuration, which does not typical indicate the treatment of the SSS configuration, to different TCI states.

In an aspect, different BSR fields of the plurality of BSR fields 510 thru 540 of FIG. 5 can be associated with different directions of movement based on an RRC signaling to trigger the SSSG-based beam switching in different directions. For example, where there is more than one train 702 and 704 and another train 706 can be considered with offset. In this case, from a gNB 111 perspective rather than signaling two separate DCIs to trigger beam switching, in order to improve the resource efficiency, the same DCI can be utilized instead and associate the second train with another separate field.

For example, an additional value can be associated with the first train in a right hand direction while indicating to the user or passenger UE 101 of train 702 to monitor the beam switching field, or the BSR field 1 (e.g., 510). For another train 704, which could be traveling to the left-hand side direction, the UE or UEs 101 of this train 704 can be indicated to monitor the BSR Index 2 (e.g., 520). In these cases, one DCI transmission can use the different fields to trigger the beam switching in different directions. For example, from the SSSG 2 to SSSG 1, or another is the opposite direction SSSG 1 to SSSG 2.

Figure 8:
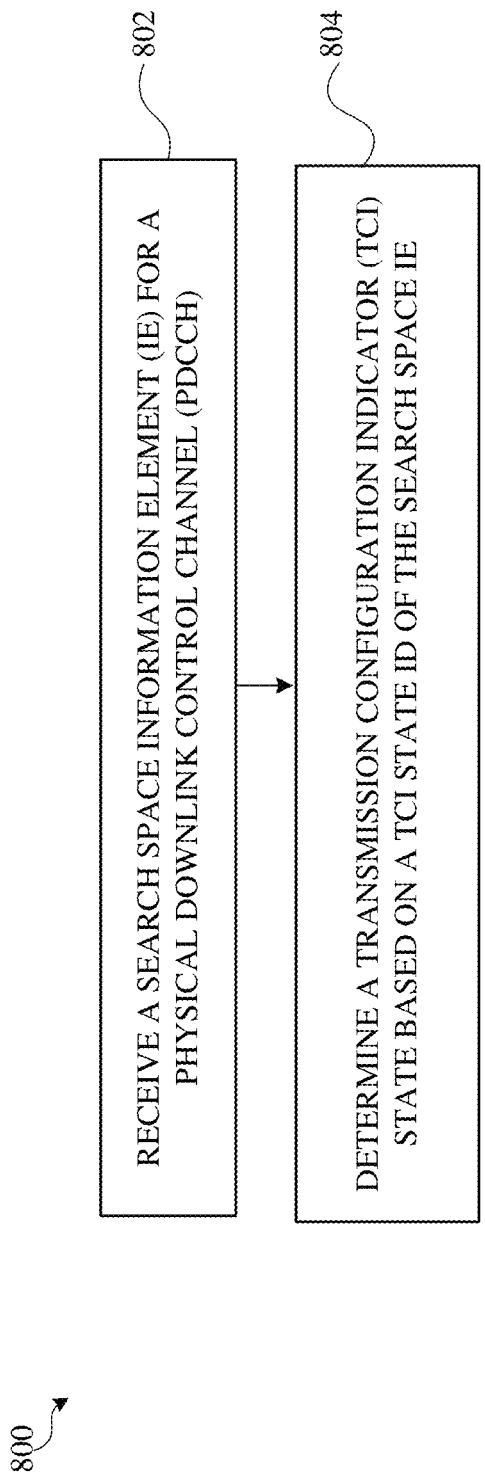
FIG. 8 is another block diagram illustrating an example process flow for group based beam switching according to various aspects.

Referring to FIG. 8, illustrated is an example process flow 800 for a network device or component (e.g., UE 101, base station 110, AP 106, baseband processor, or other network component) to perform beam switching. The process flow 800 can initiate at 802 with receiving a search space information element (IE) for a physical downlink control channel (PDCCH). At 804, the process flow further comprises determining a transmission configuration indicator (TCI) state based on a TCI state ID of the search space IE.

In another embodiment, the process flow 800 can include determining a number of PDCCH repetitions and a number of UE-specific search space (USS) repetitions associated with a control resource set (CORESET) for the TCI state based on a PDCCH repetition field of the search space IE, wherein a USS of the number of USS repetitions corresponds to the TCI state, and the TCI state indicates an antenna port quasi-co-location to determine quasi co-location information of a demodulation reference signal (DMRS) for reception of the PDCCH. The CORESET can be associated with different UE-specific search spaces related to different TCI states.

Additionally, or alternatively, SSSG can be configured based on a service cell group list (ServingCellGroupList) in order to concurrently, or simultaneously, switch from one SSSG to another SSSG for SSSG based beam switching. A search space set of an SSSG can be associated with different TCI states to enable beam switching across different PDCCH monitoring occasions. SSSG-based beam switching can thus be performed based on a downlink control information (DCI) that comprises beam switching request (BSR) fields.

Figure 9:
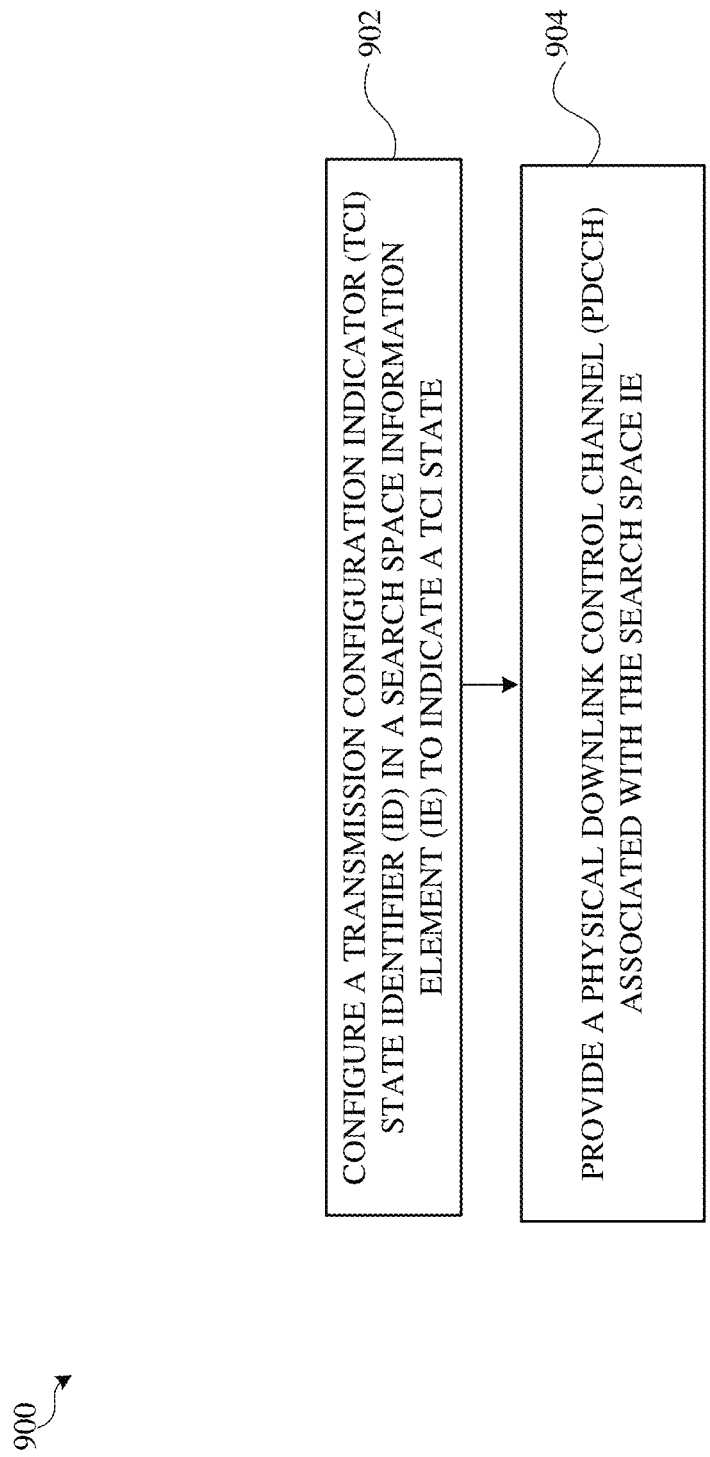
FIG. 9 is another block diagram illustrating an example process flow for group based beam switching according to various aspects.

Referring to FIG. 9, illustrated is an example process flow 900 for a network device or component (e.g., gNB, base station 110, AP 106, baseband processor, or other network component) to configure beam-switching operations in accord with various aspects. The process flow 900 can initiate at 902 with configuring a TCI state identifier (ID) in a search space information element (IE) to indicate a TCI state. At 904, a physical downlink control channel (PDCCH) associated with the search space IE can be provided (e.g., to UE 101).

In another aspect, a PDCCH repetition indication can be provided or configured in the search space IE to indicate a number of DCI repetitions across search spaces with a control resource set (CORESET).

Additionally, or alternatively, a DCI of a DCI format can be provided to a UE to trigger a beam switching among different search space set groups (SSSGs) associated with one or more different physical channels, wherein the one or more different physical channels comprise the PDCCH or another PDCCH. Different beam switching request (BSR) fields of the DCI can be configured that are associated with different directions of movement to trigger an SSSG-based beam switching in the different direction based on a configured bit value of the different BSR fields.

One or more search space sets (SSSs) of a UE search space that is associated with one or more TCI states at different SSSG indices to enable beam switching across different PDCCH monitoring occasions. An SSSG configuration can be generated based on a SSS index of SSSs, a TCI index of TCIs, and a SSSG index of SSSGs, wherein the SSS index is paired with the TCI index and a same SSS index is associated with different SSSG indices and different TCI states, for example.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an user equipment (UE) device, comprising: a memory; processing circuitry configured to: receive a search space information element (IE) for a physical downlink control channel (PDCCH); and determine one or more transmission configuration indicator (TCI) states based on one or more TCI state identifiers (IDs) of the search space IE.

A second example can include the first example wherein the processing circuitry is further configured to: determine a number of UE-specific search space (USS) repetitions for PDCCH repetitions associated with a control resource set (CORESET) for the one or more TCI states based on a PDCCH repetition field of the search space IE.

A third example can include the first or second example, wherein UE-specific search spaces of the CORESET comprise different TCI states to enable beam switching across different PDCCH monitoring occasions.

A fourth example can include any one or more of the first through third examples, wherein the processing circuitry is further configured to: receive a search space set group (SSSG) index of an SSSG that is associated with one or more search space sets to monitor the PDCCH on a serving cell, wherein a search space set (SSS) of the one or more search space sets is configured with the one or more TCI states.

A fifth example can include any one or more of the first through fourth examples, wherein the processing circuitry is further configured to: receive a downlink control information (DCI), wherein the DCI comprises one or more beam switch request (BSR) fields and is scrambled with a dedicated radio network temporary identifier; and perform SSSG-based beam switching based on the DCI.

A sixth example can include any one or more of the first through fifth examples, wherein the SSSG-based beam switching comprises switching among different SSSGs associated with the PDCCH and at least one of: a physical downlink shared channel (PDSCH) or a physical uplink shared channel (PUSCH), based on a single DCI of the DCI format.

A seventh example can include any one or more of the first through sixth examples, wherein BSR fields of the DCI comprise a location or an index for a serving cell.

An eighth example can include any one or more of the first through seventh examples, wherein different BSR fields of the plurality of BSR fields are associated with different directions of movement based on a radio resource control (RRC) signaling to trigger the SSSG-based beam switching in the different directions.

A ninth example can include any one or more of the first through eighth examples, wherein the processing circuitry is further configured to: process a search space set (SSS) of a UE search space that is associated with different TCI states at different SSSG indices to enable beam switching across different monitoring occasions.

A tenth example can include any one or more of the first through ninth examples, wherein the one or more processors are further configured to: monitor the PDCCH based on a SSS index, a SSSG index and a BSR field value, wherein the SSS index is paired with a TCI index that differs for different SSSG indices associated with the SSS index.

An eleventh example can include any one or more of the first through tenth examples, wherein the processing circuitry is further configured to: switch to a different SSSG based on a BSR field bit value.

A twelfth example can be an tangible computer readable storage device storing executable instructions that, in response to execution, cause a processor of a user equipment (UE) to perform operations, the operations comprising: receiving a search space information element (IE) for a physical downlink control channel (PDCCH); and determining a transmission configuration indicator (TCI) state based on a TCI state ID of the search space IE.

A thirteenth example can include the twelfth example, the operations further comprising: determining a number of PDCCH repetitions and a number of UE-specific search space (USS) repetitions associated with a control resource set (CORESET) for the TCI state based on a PDCCH repetition field of the search space IE, wherein a USS of the number of USS repetitions corresponds to the TCI state, and the TCI state indicates an antenna port quasi-co-location to determine quasi co-location information of a demodulation reference signal (DMRS) for reception of the PDCCH.

A fourteenth example can include any one or more of the twelfth through the thirteenth examples, wherein the CORESET is associated with different UE-specific search spaces comprising different TCI states.

A fifteenth example can include any one or more of the twelfth through the fourteenth examples, the operations further comprising: determining search space set groups (SSSGs) based on a service cell group list (ServingCellGroupList) to concurrently switch from one SSSG to another SSSG, wherein an SSS of an SSSG is associated with different TCI states to enable beam switching across different PDCCH monitoring occasions.

A sixteenth example can include any one or more of the twelfth through the fifteenth examples, the operations further comprising: performing SSSG-based beam switching based on a downlink control information (DCI) that comprises beam switching request (BSR) fields.

A seventeenth example can include any one or more of the twelfth through the sixteenth examples, wherein the DCI enables the SSSG-based beam switching to switch the PDCCH and at least one of: a physical downlink shared channel (PDSCH) or a physical uplink shared channel (PUSCH).

An eighteenth example can include any one or more of the twelfth through the seventeenth examples, the operations further comprising: monitoring the PDCCH according an SSSG indicated by a BSR field of a DCI on a serving cell at a first slot that is at least Z symbols after a last symbol of the PDCCH, wherein Z comprises an integer of one or more.

A nineteenth example can be baseband processor, comprising: a memory; processing circuitry configured to: receive a search space information element (IE) for a physical downlink control channel (PDCCH); and determine one or more transmission configuration indicator (TCI) states based on one or more TCI state identifier (IDs) of the search space IE; perform search space set group (SSSG) beam switching based on the one or more TCI states and at least one of: a search space set (SSS) index, a SSSG index, or a beam switching request (BSR) field value.

A twentieth example can include the nineteenth example, wherein the processing circuitry is further configured to: determine a PDCCH repetition based on a PDCCH repetition field of the search space IE associated with the one or more TCI states.

A twenty-first example can be a next generation NodeB (gNB) device, comprising: a memory; processing circuitry configured to: configure a transmission configuration indicator (TCI) state identifier (ID) in a search space information element (IE) to indicate a TCI state; and provide a physical downlink control channel (PDCCH) associated with the search space IE.

A twenty-second example can include the twenty-first example, wherein the one or more processors are further configured to: configure a PDCCH repetition indication in the search space IE to indicate a number of DCI or PDCCH repetitions across a number of search spaces.

A twenty-third example can include any one or more of the twenty-first example through twenty-second examples, wherein the PDCCH repetition indication indicates the number of DCI or PDCCH repetitions across the number of search spaces associated with a control resource set (CORE-SET).

A twenty-fourth example can include any one of the twenty-first through twenty-third examples, wherein the one or more processors are further configured to: provide a search space set group (SSSG) index of an SSSG to monitor the PDCCH on a serving cell based on one or more search space sets (SSSs) associated with one or more TCI states.

A twenty-fifth example can include any one of the twenty-first through twenty-fourth examples, wherein the one or more processors are further configured to: provide a serving cell group list (ServingCellGroupList) that indicates one or more SSSGs to switch from one SSSG to another SSSG for beam switching.

A twenty-sixth example can include any one of the twenty-first through twenty-fifth examples, wherein the one or more processors are further configured to: encode or scramble a cyclic redundancy check (CRC) of a DCI of a DCI format X based on a dedicated RNTI; and provide the DCI to trigger a beam switching among different SSSGs associated with one or more different physical channels.

A twenty-seventh example can include any one of the twenty-first through twenty-sixth examples, wherein the one or more different physical channels comprise PDCCHs, and at least one of: physical downlink shared channels (PDCCHs) or physical uplink shared channels (PUSCHs), based on the DCI.

A twenty-eighth example can include any one of the twenty-first through twenty-seventh examples, wherein the one or more processors are further configured to: configure beam switching request (BSR) fields in the DCI to enable SSSG-based beam switching among the different SSSGs, wherein the different SSSGs are associated with different TCI states.

A twenty-ninth example can include any one of the twenty-first through twenty-eighth examples, wherein the BSR fields comprise a location or an index of a BSR field associated with a serving cell to switch among the different SSSGs associated with different TCI states.

A thirtieth example can include any one of the twenty-first through twenty-ninth examples, wherein the one or more processors are further configured to: align the DCI of the DCI format X with a payload size of a legacy DCI format, or a fallback DCI format, to decrease user equipment (UE) blind decoding attempts, wherein the dedicated RNTI enables differentiation between the legacy DCI format and the DCI format X.

A thirty-first example can include any one of the twenty-first through thirtieth examples, wherein the one or more processors are further configured to: configure a BSR field of the BSR fields based on one of a set of bit configurations that indicate an SSSG index for beam switching.

A thirty-second example can include any one of the twenty-first through thirty-first examples, wherein at least one configuration of the set of bit configurations indicates no beam switching is to be performed.

A thirty-third example can be a tangible computer readable storage device storing executable instructions that, in response to execution, cause one or more processors of a next generation NodeB (gNB) to perform operations, the operations comprising: configuring a TCI state identifier (ID) in a search space information element (IE) to indicate a transmission configuration indicator (TCI) state; and providing a physical downlink control channel (PDCCH) associated with the search space IE.

A thirty-fourth example can include the thirty-third example, the operations further comprising: providing a PDCCH repetition indication in the search space IE to indicate a number of DCI repetitions across search spaces with a control resource set (CORESET).

A thirty-fifth example can include any one of the thirty-third through thirty-fourth examples, the operations further comprising: providing a DCI of a DCI format to trigger a beam switching among different search space set groups (SSSGs) associated with one or more different physical channels, wherein the one or more different physical channels comprise the PDCCH or another PDCCH.

A thirty-sixth example can include any one of the thirty-third through thirty-fifth examples, the operations further comprising: configuring different beam switching request (BSR) fields of the DCI that are associated with different directions of movement to trigger an SSSG-based beam switching in the different directions based on a configured bit value of the different BSR fields.

A thirty-seventh example can include any one of the thirty-third through thirty-sixth examples, the operations further comprising: configuring one or more search space sets that are associated with one or more TCI states at different SSSG indices, respectively, to enable beam switching across different PDCCH monitoring occasions.

A thirty-eighth example can include any one of the thirty-third through thirty-seventh examples, the operations further comprising: generating an SSSG configuration based on a SSS index of SSSs, a TCI index of TCIs, and a SSSG index of SSSGs, wherein the SSS index is paired with the TCI index and a same SSS index is associated with different SSSG indices and different TCI states.

A thirty-ninth example can be a baseband processor, comprising: a memory; processing circuitry configured to: provide a transmission configuration indicator (TCI) state identifier (ID) in a search space information element (IE) to indicate one or more TCI states; and provide a search space set group (SSSG) configuration comprising a search space set (SSS) index, a SSSG index, and a beam switching request (BSR) field in a DCI to enable search space set group (SSSG)-based beam switching based on the one or more TCI states.

A fortieth example can include the thirty-ninth example, the processing circuitry further configured to: enable switching to a different SSSG based on a BSR field bit value of the BSR field of the DCI, wherein the DCI triggers switching for one or more physical channels.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A user equipment (UE) device, comprising:
transceiver circuitry;
processing circuitry coupled to the transceiver circuitry and configured to:
obtain configuration of two or more search space set groups (SSSGs) associated with the same control resource set (CORESET), wherein each SSSG includes one or more search space sets (SSSs), each SSS being associated with a transmission configuration indicator (TCI) state,
perform physical downlink control channel (PDCCH) monitoring based on a first SSSG that includes a first SSS associated with a first TCI state;
in response to receiving DCI format that indicates, in a beam switching request (BSR) field of the DCI, a second SSSG that includes the first SSS associated with a second TCI state, wherein the DCI format comprises a plurality of BSR fields each carrying a bit configuration that indicates an SSSG, further wherein at least two of the plurality of BSR fields of the DCI format are associated with different directions of movement based on a radio resource control (RRC) signaling to trigger the SSSG-based beam switching in the different directions,
control the transceiver circuitry to perform beam switching to the second TCI state; and
perform PDCCH monitoring in the first SSS based on the second TCI state.

2. The UE device of claim 1, wherein the processing circuitry is further configured to:
determine a number of UE-specific search space (USS) repetitions for PDCCH repetitions associated with the CORESET for one or more TCI states based on a PDCCH repetition field of a search space IE.

3. The UE device of claim 2, wherein UE-specific search spaces of the CORESET comprise different TCI states to enable beam switching across different PDCCH monitoring occasions.

4. The UE device of claim 1, wherein the beam switching comprises switching among different SSSGs associated with PDCCH associated with the CORESET and at least one of: a physical downlink shared channel (PDSCH) or a physical uplink shared channel (PUSCH), based on the DCI format.

5. The UE device of claim 1, wherein at least one bit configuration of a set of bit configurations that may be carried by the BSR fields indicates no beam switching is to be performed.

6. A baseband processor coupled to a memory and configured to:
obtain configuration of two or more search space set groups (SSSGs) associated with the same control resource set (CORESET), wherein each SSSG includes one or more search space sets (SSSs), each SSS being associated with a transmission configuration indicator (TCI) state,
perform physical downlink control channel (PDCCH) monitoring based on a first SSSG that includes a first SSS associated with a first TCI state;
in response to receiving DCI format that indicates, in a beam switching request (BSR) field of the DCI, a second SSSG that includes the first SSS associated with a second TCI state, cause beam switching to the second TCI state, wherein the DCI format comprises a plurality of BSR fields each carrying a bit configuration that indicates an SSSG, further wherein at least two of the plurality of BSR fields of the DCI format are associated with different directions of movement based on a radio resource control (RRC) signaling to trigger the SSSG-based beam switching in the different directions; and perform PDCCH monitoring in the first SSS based on the second TCI state.

7. The baseband processor of claim 6, further configured to:

determine a number of PDCCH repetitions based on a PDCCH repetition field of a search space IE associated with the one or more TCI states.

8. A base station, comprising:

a memory;

processing circuitry configured to:

identify a configuration of a user equipment (UE) of two or more search space set groups (SSSGs) associated with the same control resource set (CORESET), wherein each SSSG includes one or more search space sets (SSSs), each SSS being associated with a transmission configuration indicator (TCI) state, determine that the UE is to switch from a first TCI state associated with a first SSS in a first SSSG to a second TCI state associated with the first SSS in a second SSSG; and transmit a downlink control information (DCI) format that indicates, in a beam switching request (BSR) field, the second SSSG to cause the UE to switch to the second TCI state, wherein the DCI format comprises a plurality of BSR fields each carrying a bit configuration that indicates an SSSG, further wherein at least two of the plurality of BSR fields of the DCI format are associated with different directions of movement based on a radio resource control (RRC) signaling to trigger the SSSG-based beam switching in the different directions.

9. The base station of claim 8, wherein the processing circuitry is further configured to:

configure a PDCCH repetition indication in a search space IE to indicate a number of downlink control information (DCI) format or physical downlink control channel (PDCCH) repetitions across a number of search spaces.

10. The base station of claim 8, wherein the configuration comprises a serving cell group list (ServingCellGroupList) that indicates one or more SSSGs to switch from one SSSG to another SSSG for beam switching.

11. The base station of claim 8, wherein the DCI format triggers beam switching for a physical downlink control channel (PDCCH), comprise PDCCHs, and at least one of: a physical downlink shared channel (PDSCH) or a physical uplink shared channel PUSCH.

12. The base station of claim 8, wherein the processing circuitry is further configured to:

configure beam the BSR fields carry a bit configuration that indicates an SSSG or that no beam switching is to be performed.

13. The base station of claim 12, wherein the processing circuitry is configured to indicate to the UE to monitor a BSR field associated with a present direction of motion of the UE.

14. The baseband processor of claim 6, wherein at least one bit configuration of a set of bit configurations that may be carried by the BSR field indicates no beam switching is to be performed.

15. The UE device of claim 1, wherein the processing circuitry is further configured to receive indication to monitor a particular BSR field from amongst the one or more BSR fields in the DCI format.

16. The baseband processor of claim 6, further configured to receive indication to monitor a particular BSR field from amongst the one or more BSR fields in the DCI format.

* * * * *